United States Patent [19]

Meckler

[11] Patent Number: 4,887,438
[45] Date of Patent: Dec. 19, 1989

[54] DESICCANT ASSISTED AIR CONDITIONER

[76] Inventor: Milton Meckler, 16348 Tupper St., Sepulveda, Calif. 92343

[21] Appl. No.: 315,592

[22] Filed: Feb. 27, 1989

[51] Int. Cl.[4] .............................................. F25D 23/00
[52] U.S. Cl. .......................................... 62/271; 62/94
[58] Field of Search ..................................... 62/94, 271

[56] References Cited

U.S. PATENT DOCUMENTS

| | | | |
|---|---|---|---|
| 3,488,971 | 1/1970 | Meckler | 62/94 X |
| 3,774,374 | 11/1973 | Derfour et al. | 62/94 X |
| 4,024,908 | 5/1977 | Meckler | 165/18 |
| 4,300,623 | 11/1981 | Meckler | 165/16 |
| 4,474,021 | 10/1984 | Harband | 672/271 X |
| 4,691,530 | 9/1987 | Meckler | 67/138.1 |
| 4,719,761 | 1/1988 | Cromer | 62/271 X |
| 4,730,461 | 3/1988 | Meckler | 62/159 |
| 4,739,624 | 4/1988 | Meckler | 62/160 |

Primary Examiner—Lloyd L. King
Attorney, Agent, or Firm—William H. Maxwell

[57] ABSTRACT

A desiccant assisted air conditioning system for delivering dehumidified refrigerated supply air into a conditioned space and with return therefrom divided between recirculation air and exhaust-relief air employed to remove heat resulting from dehumification and employing waste heat from refrigeration for desiccant regeneration.

19 Claims, 5 Drawing Sheets

FIG. 1. CONSTANT VOLUME VARIABLE TEMP.

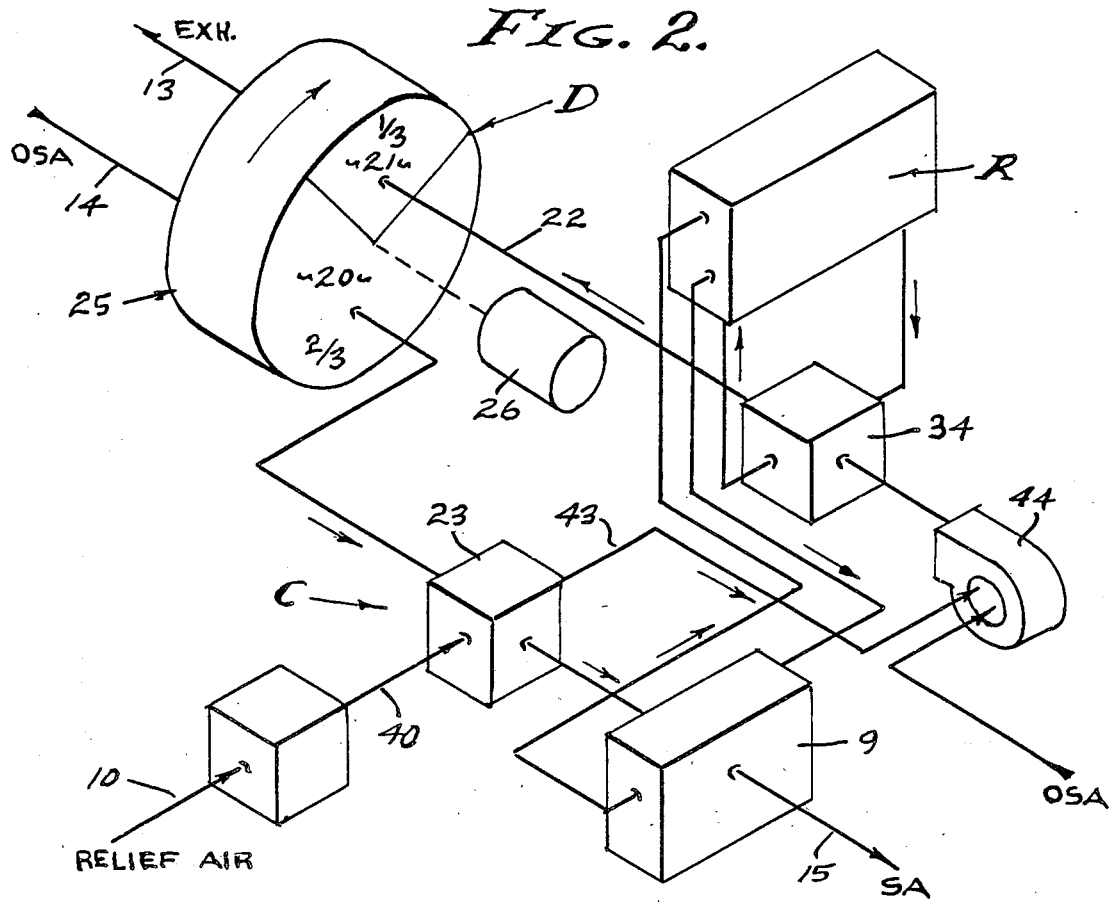
FIG. 2.
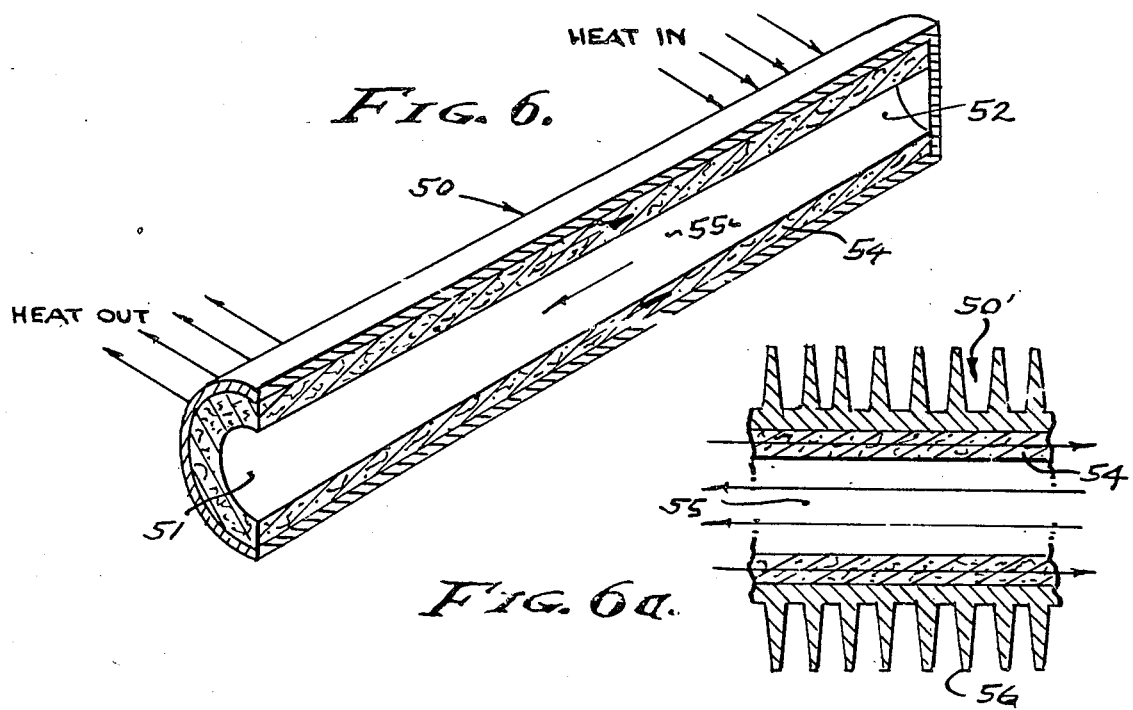
FIG. 6.
FIG. 6a.

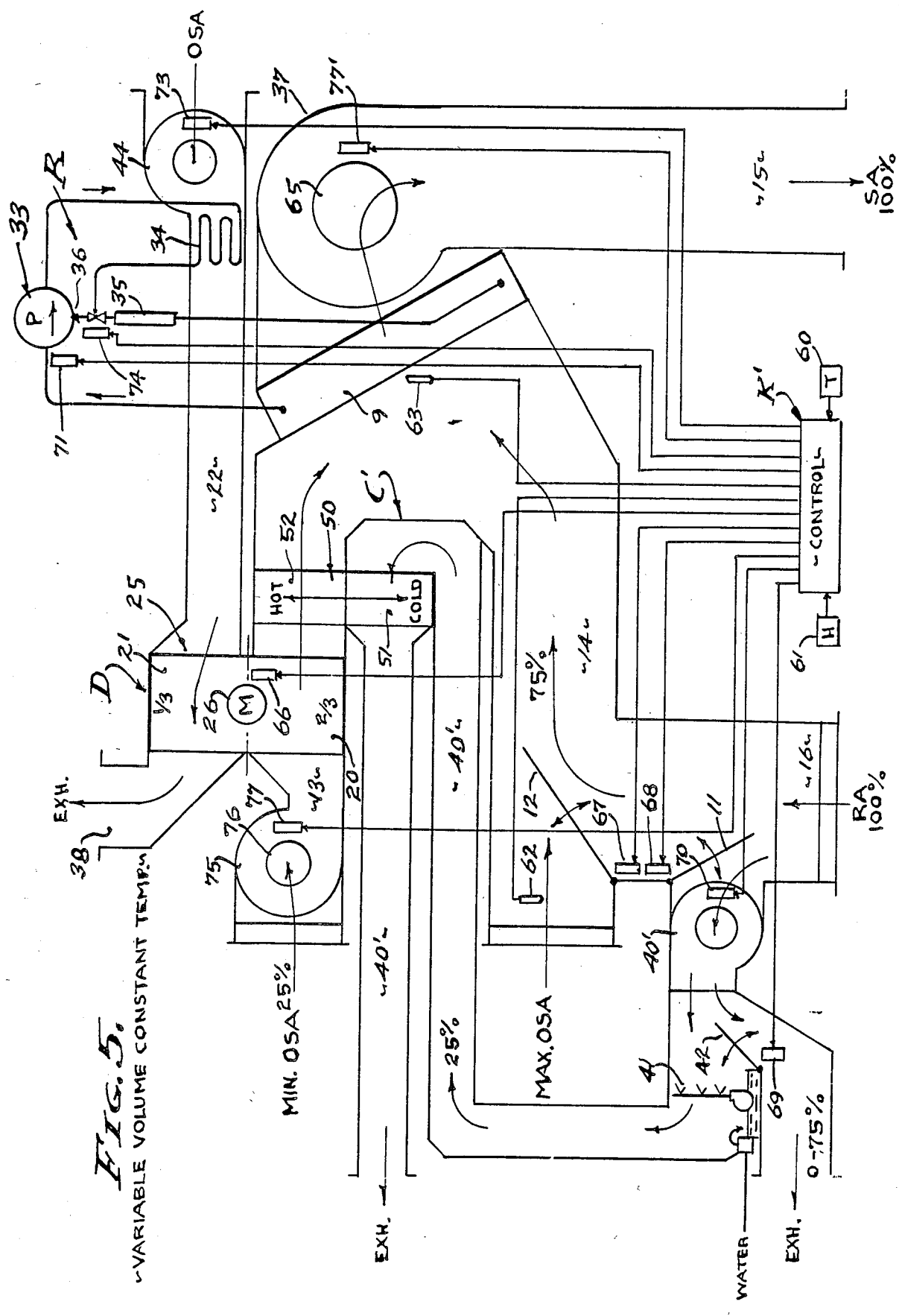

DESICCANT ASSISTED AIR CONDITIONER

BACKGROUND OF THE INVENTION

This invention relates to an electrically operated system that conditions air to be used in occupied building space so that it is both cooled and dehumidified. The optimum temperature range for human comfort is well established while the humidity range is recognized but not universally applied. For example, heretofore a range of 20% to 80% was thought to be permissive, while a more optimum range of 40% to 60% is now shown to be required in order to minimize and/or eliminate bacterial, viral and fungal growth. Humidity has its affect upon air cleanliness, as it reduces the presence of dust particles, and the deterioration of building structure and contents, otherwise subjected to excess moisture. Accordingly, humidity control becomes an important factor as related to both human comfort and health, and to structural longevity as well.

Electrically powered mechanical refrigeration is employed here for sensible cooling, and desiccant dehumidification is combined therewith. Supply air (SA) to the building space is from both outside air (OSA) and return air (RA), the proportion thereof being a greater amount of return air and a minimized amount of outside air, for example 75% RA to 25% OSA. The minimum outside air is dehumidified and mixed with return air and controlled by a damper prior to cooling by means of direct expansion in evaporator coils of the refrigeration system, the air cooled or chilled thereby being discharged into the building space as supply air (SA).

A feature of this invention is the desiccant dehumidifier that is regenerated by a column of heated air tempered by waste heat of the refrigeration system, a mechanical system with a condenser coil thereof in the heated air column at the regeneration side of the dehumidifier. It is to be understood that a solid desiccant or liquid desiccant dehumidifier can be employed as desired. In practice, a solid desiccant system is prefered, of the dynamic type and of rotary bed configuration, wherein the bed is a wheel comprised of a screen of tubes or plates of solid desiccant to which air can be continuously exposed, progressively exposed to a dehumidifying air duct and then to a regeneration air duct. The dehumidifying is from minumum outside air (OSA) to be mixed with return air (RA) and then cooled and discharged as supply air (SA). The regeneration air duct is also from outside air (OSA) to be discharged to ambient as exhaust (EXH). The greater portion, approximately ⅔ of the rotary bed of desiccant is exposed to the dehumidifying duct, while the lesser portion, approximately ⅓, is exposed to the regenerating air duct. The heated air regeneration duct is supplied with outside air (OSA) by means of a blower, and the air heated by a condenser coil, and then discharged to atmosphere (EXH) after regeneration of the desiccant. The air ducts are sealed with the rotary bed of desiccant which is rotated slowly by a variable speed motor.

By using a solid desiccant to precondition the minimum outside air (OSA) it is possible to operate the evaporator coil at a substantially elevated temperature as compared with the conventional mechanical refrigeration systems, thereby reducing net energy requirements for the same net cooling load. When air is dried with desiccants, it's temperature rises because the latent heat and heat from the regenerated desiccant and its carrier are transferred to the dried air. Therefore, it is an object of this invention to compensate for this heat rise effect by providing an after cooling means associated with the exhaust of excess return air (RA) to atmosphere, utilizing a cooling effect therefrom to remove heat leaving the dehumidifying desiccant. thereby reducing load on the downstream refrigerant evaporation coil. The relative cooling requirements of the different available desiccants relate directly to the amount of regenerating energy employed, because of the carry-over of heat by the desiccant and associated structure. This heat, plus the heat of condensation, must be removed by cooling. As a result, relative cooling requirements for the different types of commercially available dehumidifiers represent a significant portion of the regeneration energy requirement.

In accordance with this invention, the after cooling means is embodied in several forms. The excess discharge of return air (RA) is at a relatively low temperature and of relatively low humidity, coming from the conditioned air space, and is subject to being evaporatively cooled. Accordingly, it is this exhaust air flow which is advantageously utilized to absorb heat from heated air leaving the desiccant dehumidifier; in one embodiment by means of evaporatively cooled air flowing through a heat exchanger; and in one embodiment by means of heat pipes extending between cold side and hot side heat exchangers in the return air exhaust duct and in the desiccant dehumidifier delivery duct. As will be described, the evaporative cooler and/or heat pipes transfer heat energy between the outgoing and incoming air.

Desuperheating is used to supply liquid desiccant in the liquid desiccant embodiment herein disclosed, to spray cooler desiccant liquid into the humidifying section thereof. The dehumidifying fluid circuit is associated with the refrigeration compressor as will be described.

SUMMARY OF THE INVENTION

This invention involves dehumidification and refrigeration of air, utilizing a desiccant, and preferably a solid desiccant rotary wheel in an electrically operated package air-conditioning or heat pump unit. By reducing the operating cost of regenerating the desiccant using a novel recovery system, net savings are realized so as to recover any additional investment costs. The combined components of a vapor-compression system with a desiccant system, a hybrid system, efficiently removes the sensible and latent cooling loads, a general object of this invention. The vapor-compression machine operates with higher evaporator temperatures resulting in a higher thermal (COP) or coefficient of performance than conventional vapor-compression units wherein both latent and sensible loads are removed by a common evaporator coil. A feature is that this hybrid system requires no reheat for regeneration, while the dehumidifier need only remove sufficient moisture to meet the latent load as the sensible load is met by the vapor-compression machine, and consequently no overdrying is required. This system thereby reduces the size of the dehumidifier wheel and also the amount of energy required to regenerate the dehumidifier, as compared with a separate desiccant system. A primary advantage of this hybrid system is that it reduces the required energy input, due to an increased overall coefficient of performance, heat rejected by the refrigeration condenser air coil being used to regenerate the desiccant, eliminating the need for external regenerative heat.

The performance of a desiccant dehumidifier is a direct function of the type of desiccant material used, the internal geometry of the dehumidifier (i.e., manner-/arrangement by which the desiccant is deployed within the dehumidifier matrix), and the equipment operating parameters. The material type affects size, range of operation (temperature, humidity), efficiency, cost, and service life. The desiccant choice also affects the thermal COP and cooling capacity of the system. The geometry of a dehumidifier affects it's pressure drop, size, and cost, and thus the thermal and electrical COP'S and cost of the cooling system. Control strategies also affect the overall performance. Silica gel has a high moisture recycling capacity, whereas lithium chloride, a hygroscopic salt used in currently available commercial dehumidifiers, is preferred and considered the state of the art desiccant for wheel type dehumidifiers, in particular. Parallel passage geometries have high rates of heat and mass transfer and low pressure drop. Savings in refrigeration capacity can be achieved by using a solid desiccant wheel in lieu of a conventional cooling coil to remove the latent load associated with minimum outdoor ventilation air flow. Accordingly, minimum outdoor air requirements necessary for maintaining satisfactory indoor air quality increase significantly due to use of tighter building envelopes, and greater indoor air quality (IAQ) concerns for outdoor-/indoor contaminants. Therefore, this all electric solid desiccant unit requires less refrigeration capacity per net cooling ton, and the comparative performance of the installed refrigeration also improves significantly since the cooling coil suction temperature is raised and dehumidificaiton provided upstream of the cooling coil.

Desiccant dehumidification significantly reduces the latent cooling load burden on the refrigeration equipment, and overall effect is a net increase in efficiency. Therefore, if the refrigeration equipment performs only sensible cooling, then the ventilation and air conditioning equipment will be using far less energy for the same thermal load requirement, due to operation at a higher suction temperature. Use of a solid desiccant dehumidifier wheel essentially allows operating at a higher apparatus dew point so as to provide the same supply air condition compared to the non-use of desiccant dehumidification. As an approximation example, the horsepower per ton for a compressor alone increases between 15 to 20 percent when the required evaporator temperature drops from 40° to 30° F., the effect on the sensible heat ratio. There is a need of reheating for refrigeration dehumidificaiton in those situations where coil temperatures approach freezing, so that coil condensation is always maintained above freezing on the air supply side.

The major operating cost of a desiccant dehumidifier wheel is the reactivating cost, since moisture absorbed by the desiccant must be removed in order to reactivate the desiccant for subsequent re-use. Heretofore, air has been preheated using heaters and then applied to dry the desiccant. With the present invention, efficiency at design conditions is improved by using the waste heat from the refrigeration condenser to heat the reactivation air. For units operating year-round reactivation heat recovery is particularly effective during winter when reactivation inlet air temperatures are relatively low. In practice, it is possible to provide heated regenerator air temperature up to 210° F. using refrigerant-22. The moisture removal capacity of the reactivation air depends upon the prevailing outdoor weather conditions. However, for the required temperature of the reactivation for silica gel or lithium chloride liquid desiccants, air is not likely to exceed 210° F. for most comfort applications. Generally and for example, only 50% of the energy recovered will be required to completely reactivate the desiccant using preheated air at 190° F.

One of the recognized problems in using a desiccant wheel exposed to both incoming untreated air and heated regeneration air is the associated thermal dumpback by conduction from the desiccant wheel to the treated air which must then be removed by the downstream cooling coil. It is an object of this invention to reduce this substantial parasitic load by reducing the condenser coil discharge air temperature automatically as latent loading is decreased by means of injecting liquid refrigerant directly into the compressor while not affecting its overall cooling capacity. Liquid injection is used herein to increase the pressure ratio in a positive displacement type compressor. Liquid injection also serves as a means to reduce its discharge gas temperature and thereby reduce motor temperature, since its associated hermetically sealed compressor motor is cooled by discharge gas. For general purpose air conditioning, the pressure ratio does not normally require special cooling if the motor is cooled by suction gas. However, where higher discharge tmeperatures are required for the regeneration of desiccant wheels, use of liquid injection reduces excessive temperatures otherwise resulting from an increase in resulting pressure ratios. This liquid injection is by means of metering a small amount of liquid from the condenser to the compressor compression chamber. And, since this injection occurs essentially after the chamber is closed, the capacity is about the same, while the discharge temperature is lower at any corresponding increased pressure ratio. This injected liquid is an effective means that reduces discharge temperature.

The foregoing and various objects and features of this invention will be apparent and fully understood from the following detailed description of the typical preferred forms and applications thereof, throughout which description reference is made to the accompanying drawings.

THE DRAWINGS

FIG. 2 is a perspective diagram of the rotary desicant wheel of FIG. 1 and its relationship to waste refrigeration heat and to return air and exhaust associated with the after cooling means.

FIG. 5 is a schematic diagram similar to FIG. 1, showing an embodiment of the invention characterized by the after cooling means employing heat pipes that absorb heat energy resulting in the heat rise from the dehumidifying desiccant.

FIG. 6 is a perspective fragmentary section of a heat pipe configuration employed in the embodiment of FIG. 5, and FIG. 6a is a sectional view showing an improved form of heat pipe, finned for efficiency, it being understood that the solid desiccant wheel can be substituted for by the packed type desiccant of FIG. 3 when employing heat pipes for energy transfer.

PREFERRED EMBODIMENT

Figure 1:
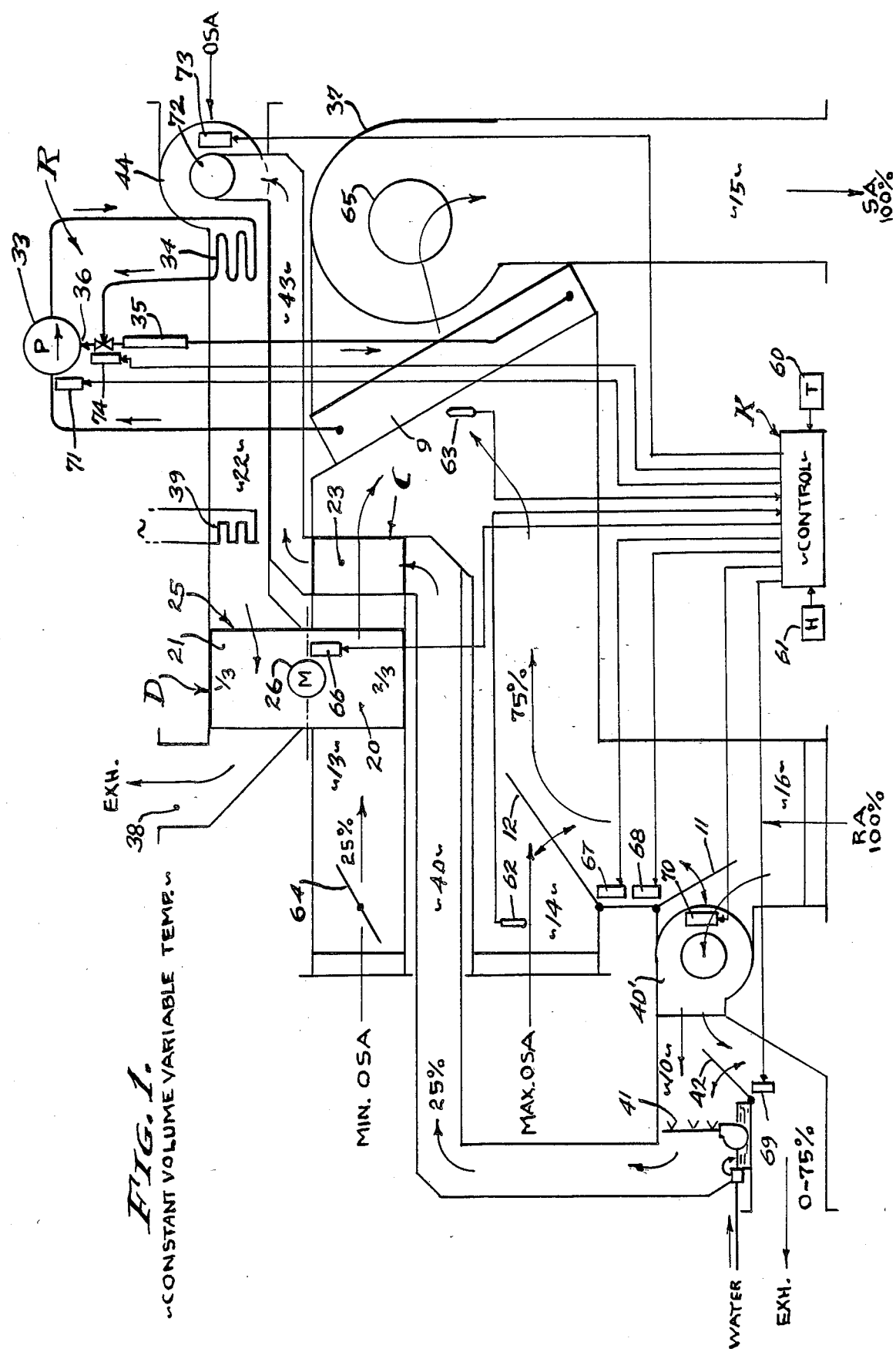
FIG. 1 is a schematic diagram of the desiccant assisted air conditioning system of the present invention, characterized by after cooling means, a cooled return air embodiment, that absorbs heat energy resulting in the heat rise from the dehumidifying desiccant and the discharge therefrom that employs waste heat from refrigeration and used for regeneration of the desiccant.

Referring now to the drawings, this invention provides a Desiccant Assisted Air Conditioner which is characterized by desiccant dehumification plus sensible cooling. As shown generally in FIG. 1 of the drawings, minimum, approximately 25%, outside air (OSA) enters through dehumidifiying means D, while maximum, approximately 75%, return air (RA) is recirculated, both entering through a cooling coil 9 of a sensible cooling refrigeration means R to be discharged as supply air (SA) into an occupied space or the like to be air conditioned thereby. Since there is a continuous induction of outside air (25%), there is an exhaust duct 10 controlled by a variable damper and control means 11 which controls the exhaust of relief air as may be required, this relief air being usefully employed in the after cooling means C which characterizes this invention. As shown, there is a variable damper and control means 12 controlling the inlet of outside air (OSA) that is mixed with the recirculated return air (RA) so that the required volume of air is replaced and so that the mixed air is not less than about 55° F. at the entry through the refrigeration coil 9. Accordingly, there is an outside air inlet duct 13 for induction of minimum outside air to be dehumidified, there is an outside air inlet duct 14 for induction of maximim outside air to be mixed with the dehumidified air from duct 13, there is a supply air duct 15 into the air conditioned space, there is a return air duct 16 from the air conditioned space, and there is the exhaust duct 10 and variable damper control means 11 that separates the required volume of return air from duct 16. The damper control means 11 and 12 operate independently and/or together, and inversely proportion the two columns of air as may be required upon demand for 100% air circulation through the cooling coil 9.

Figure 7:
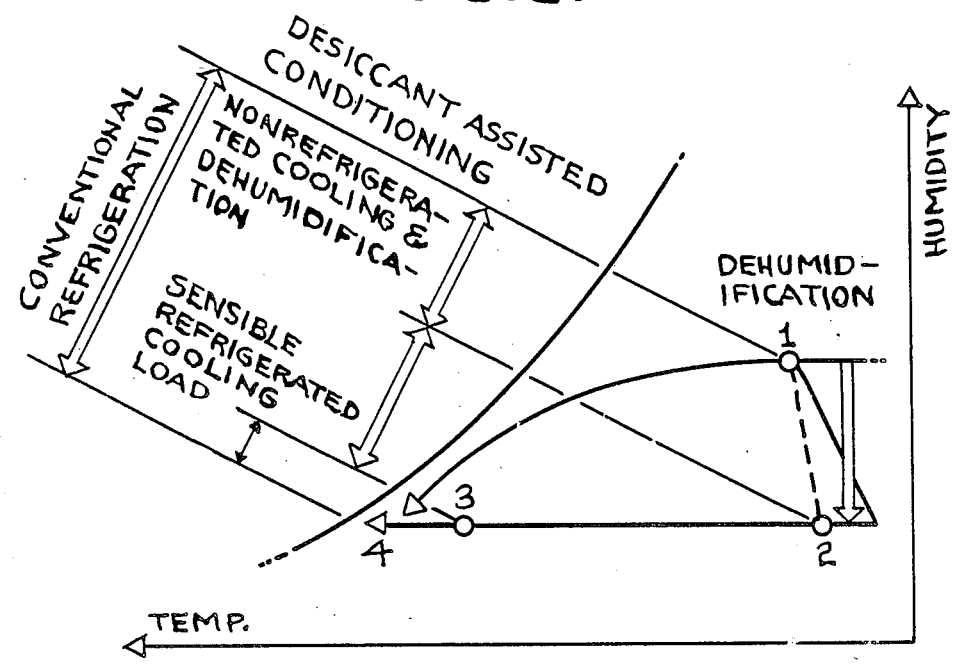
FIG. 7 is a psychometric graph of this desiccant dehumidification plus sensible cooling process without reheat, compared with a conventional refrigeration process using sensible cooling and dehumidification plus reheat.
Figure 8:
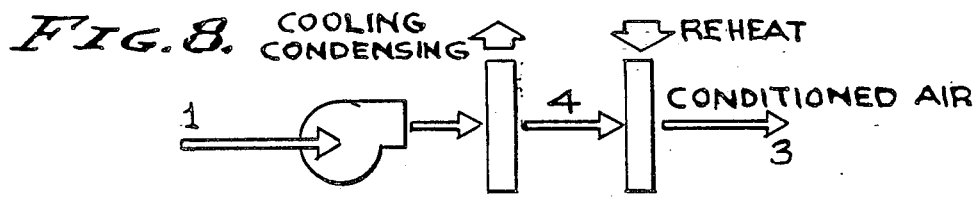
FIG. 8 is a diagram of said conventioanl process.
Figure 9:
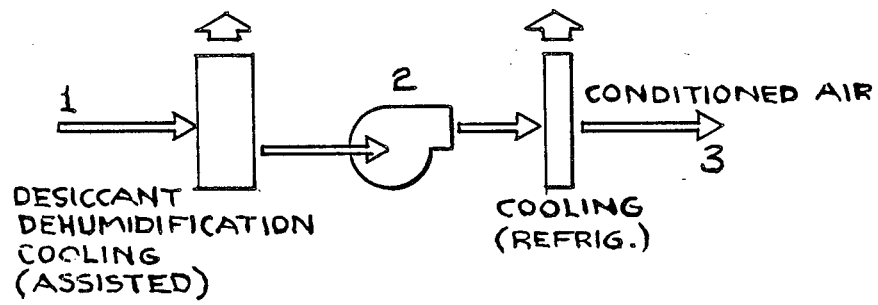
FIG. 9 is a diagram of this invention and its desiccant dehumification.

Referring now to the graph of FIG. 7 and to the diagrams of FIGS. 8 and 9, return air (RA) enters through the refrigeration cooling coil 9 at 2 and is discharged as supply air (SA) at 3. However, in the case of the conventional process shown in FIG. 8, the refrigeration energy line extends to 4, whereas the refrigeration energy line in this process shown in FIG. 9 extends only to 3; a substantially lower energy use without the requirement for reheating. Note the absence of a reheating coil in FIG. 9. In practice, the energy saving with this invention can be 10% to 15% and reheating after refrigeration is eliminated.

Figure 3:
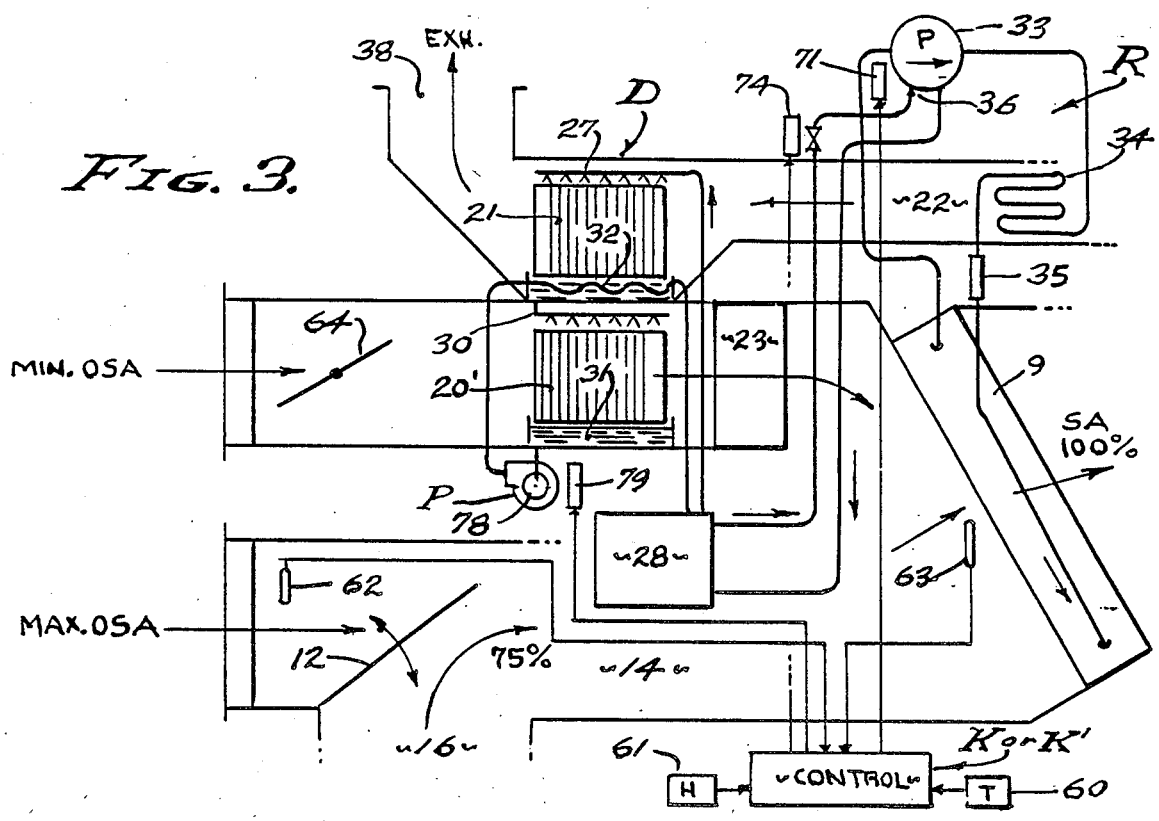
FIG. 3 is a schematic diagram, similar to a portion of FIG. 1, showing an embodiment of the invention characterized by the after cooling means applied to a packed type desiccaant dehumidifier.
Figure 4:
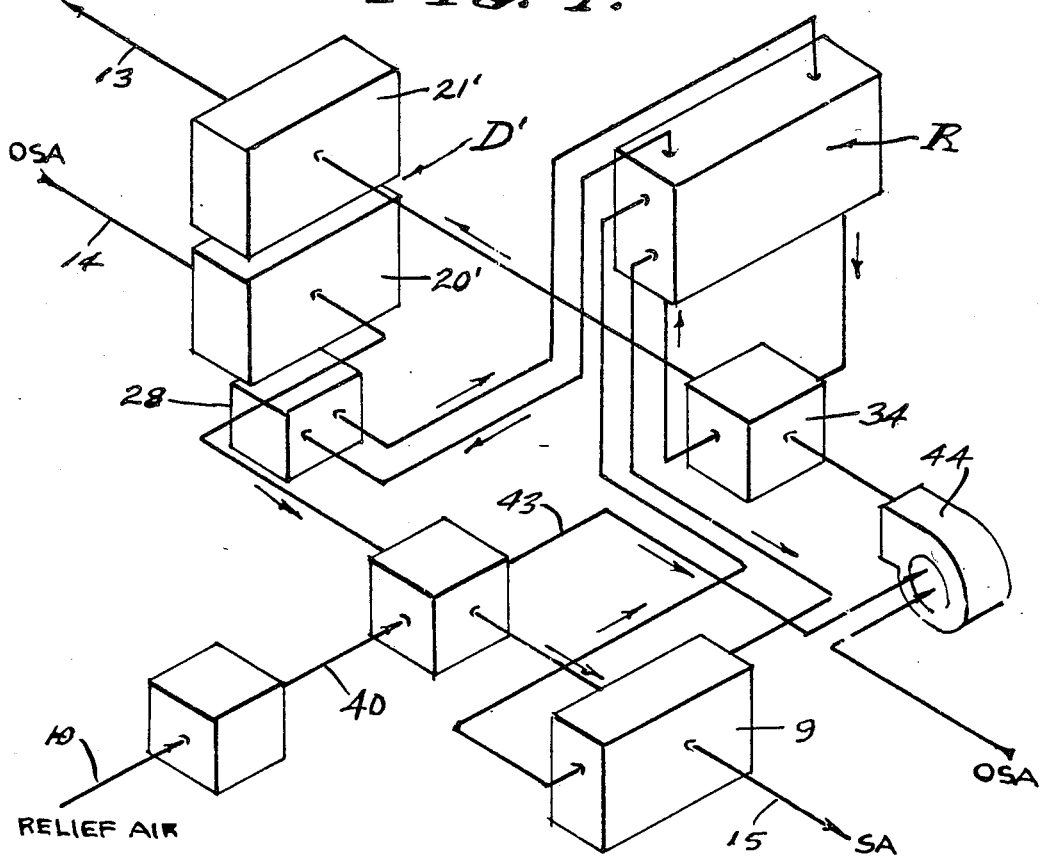
FIG. 4 is a perspective diagram of the packed type dehumidifier, illustrating its relationship to the waste refrigeration heat and to cooled return air associated with the after cooling means.

The dehumidifier means D can vary in form and mode of operation as may be required, and is of the regeneration type having a dehumifying section 20 in the outside air inlet duct 13 and having a regenerating section 21 in a separate outside air duct 22. The dehumifying section 20 discharges through a heat exchanger 23 and into the outside air inlet duct 14 ahead of the refrigeration cooling coil 9, whereby the heat rise due to desiccant dehumidification is reduced and/or removed from the induced column of air through duct 13. Heat exchanger 23 is part of the after cooling means C as will be described. As shown in FIG. 2, approximately one third of the desiccant wheel is devoted to the inlet duct 13 for the induction of minimum outside air, while two third of the desiccant wheel is devoted to regeneration of the moisture saturated desiccant, by means of heated or tempered air delivered through duct 22 wherein waste heat is recovered from the refrigeration means R. As shown in FIGS. 1 and 2, the desiccant dehumidifier means D is a solid desiccant wheel, whereas the dehumidifier means D' shown in FIGS. 3 and 4 is a packed type apparatus which is stationary. The desiccant wheel 25 of FIGS. 1 and 2 revolves by means of a variable speed motor and control means 26.

In FIGS. 3 and 4 of the drawings the packed type desiccant dehumidifier D' is comprised of stationary sections 20' and 21' for dehumidifying and regeneration respectively. As shown, a desiccant spray bar 27 supplied with desiccant from a desuperheating means 28 discharges through the core of regenerating section 21' and into a sump 29 from which it flows through a spray-bar 30 for discharge through the core of the dehumidifying section 20' and into a sump 31 from which it is circulated by a pump P through a cooling coil 32 immersed in the sump 29 and recirculated through the desuperheating means 28. As shown, the hot suction refrigeration gas passes through the desuperheating means 28 for decreasing its temperature, thereby removing its superheat while causing an increase in the temperature of the spent desiccant, to assist in its subsequent regeneration by liberating the moisture therefrom. In practice, a portion of the refrigeration gas discharge is routed through the desuperheater means 28, a part of the refrigeration coil, where heat is removed. This cooler desuperheated gas returns to the compressor and is mixed with the discharge gas to produce a cooler more dense mixture that passes over the motor and its windings to remove more heat than possible with gas that is not desuperheated. The dehumidified air passing through the dehumidifier section 20 or 20' experiences a heat rise that is reduced if not eliminated by the after cooling means C as will be described.

The refrigeration means R is shown for refrigeration only, though it may be a heat pump means when so desired. There is a compressor and variable speed motor means 33 to direct compressed refrigerant through a condenser coil 34 from which it discharges through a capillary tube 35 and expands through the cooling coil 9. The above described desuperheating means 28 connection is adjacent to the refrigerant discharge so that much of the oil passing through the compressor will be entrained with the gas flowing into the coil of the desuperheater means 28. This oil will then be carried with the gas and returned to the compressor to be mixed with the oil returning from the motor and integral separating elements, all of which are cooled thereby. The resulting drop in compressor temperature will cause less superheating of the suction gas and a greater mass flow rate.

The increase in cooling effect is greater than the increase in power consumed, thereby producing a substantial increase in desuperheating effect. In accordance with this invention, liquid injection into the comnpressor is at 36, into the compressor shell, which does not decrease compressor capacity, as a full suction volume will have been taken into the compressor shell before the liquid flashes or expands. Power consumption and system charge will only be marginally higher, approximately 1° to 2°.

The refrigeration means R absorbs heat from the two columns of air emanating from the inlet duct 13 and recirculation duct 14, by means of the evaporative cooling coil 9. Refrigerated air passing through coil 9 is delivered by a blower 37 through the duct 15 as supply air (SA). The minimum outside air (OSA) entering through duct 13 experiences a significant heat rise as it is dehumidified when passing through the dehumidifier section 20 (20'), and this unwanted heat is immediately removed by the after cooling means C And, the refrigeration means R dissipates heat from the condenser coil 34 placed in the outside air (OSA) inlet duct 22, so as to heat that column of air for desiccant regeneration by passing the same through the regenerating section 21 (21') of the dehumidifier means D. The column of air passing through the regenerating section takes on moisture and is exhausted at 38. Supplemental heat can be applied to the column of air in duct 22 as by heater means 39, an electrical heater as shown.

Referring now to the embodiment of FIGS. 1 and 2, the after cooling means C involves the exhaust duct 10 that is supplied with relief air by variable speed blower means 40' that draws return air from duct 16. A portion of all of the exhaust air (25%) is available as relief air. The air exhausted through duct 10 is demumidified as it comes from the air conditioned building space, and accordingly will support an evaporative cooling process for its further cooling. Accordingly, evaporative cooling means 41 is provided in the relief air duct 40, following a relief air damper and control means 42 that selects the required volume of relief air for reducing and/or eliminating the heat rise experienced through the dehumidifier section 20 (20').

In accordance with this invention, the column of evaporatively cooled relief air is discharged through the heat exchanger 23 to absorb the heat rise discharge from the dehumidifier section 20 (20'), controlling and/or reducing the induction air temperature from duct 13 so that air temperature ahead of the cooling coil 19 is at or less than 55° F., thereby precluding icing. It is otherwise difficult to employ refrigeration for dehumidification if the cooling surfaces must be below freezing to obtain desired results, because condensed moisture will freeze on the cooling coils and cannot be drained off during operation. Moreover, ice or frost build-up reduces efficiency and impedes air flow.

In accordance with this invention, discharge of relief air at an elevated temperature from heat exchanger 23 is conducted to the outside air (OSA) inlet duct 22 by a transfer duct 43 where it is mixed with inducted outside air and delivered through duct 22 by a blower means 44. Accordingly, the heat energy absorbed from the heat exchanger 23 supplements waste heat of refrigeration from condenser coil 34. This total heat energy is then available for desiccant regeneration in the section 21 (21') of the dehumidifier means D, after which it is exhausted at 38. Thus, it will be seen that relief air through duct 40 is advantageously employed as it progresses through the process of evaporative cooling in order to absorb unwanted heat resulting from dehumidification at heat exchanger 23, and through the process of heat absorption in said heat exhanger 23 and usefully employed in the desiccant regeneration process at regeneration section 21 (21') of the dehumidfying means D.

Referring now to the embodiment of FIGS. 5 and 6, the after cooling means C' involves the relief air duct 40' that draws a portion ar all of the exhaust air from the exhaust duct 10. As in the embodiment of FIGS. 1 and 2, the air exhausted through duct 10 is return air (RA) which remains substantially dehumidified as it comes from the air conditioned building space, and accordingly will support an evaporative cooling process for its further cooling. Accordingly, the evaporative cooling means 41 is employed following the variable air damper and control means 11 as hereinabove described. In accordance with this embodiment, heat pipes 50 replace the heat exchanger 23 and transfer duct 43, the relief air duct now exhausting directly to atmosphere as shown. The heat pipes 50 are combined with and operate between the relief air duct 40' and discharge of the minimum outside air (OSA) inlet duct 13, at the discharge thereof into the recirculation duct 14, after the heat rise from the dehumidifier section 20 (20'). The heat pipes 50 are characterized by a hot end 52 for absorbtion of heat and by a cold end 51 for dissipation of heat. In other words, there is a "heat in" end 52 and a "heat out" end 51. In carrying out this invention the "heat out" cold end 51 of each heat pipe is placed in the relief air duct 40' following the evaporative cooling means 41, and the "heat in" hot end 52 of each heat pipe is placed in the discharge of the inlet duct 13 following the dehumidifier section 20 (20'). Accordingly, there is a heat transfer that occurs between ducts 40' and 13, and controlled so as to reduce the induction air temperature from duct 13 so that air temperature ahead of the cooling coil 9 is at or no less than 55° F.

Transfer of heat energy from the discharge end of the inlet duct 13 and the exhaust or relief air duct 40' is by means of a bank comprised of a multiplicity of heat pipes, the cold ends 51 in the form of heat dissipaters placed in the exhaust discharge of duct 40' and the hot ends 52 in the form of heat absorbers placed in the discharge of duct 13 into the duct 14 ahead of the evaporative cooling coil 9. In practice, the heat pipes are short lengths of heat conductive material, tubing sealed at their ends, having fitting tubular wicks 54 and charged with a refrigerant 55, a gas-liquid. A temperature differential between the ends of each pipe causes the refrigerant 55, liquid to migrate by capillary action to the warmer end where evaporation thereof takes place and absorbs heat. The resultant refrigerant vapor then returns through the hollow tube center of the wick and to the cooler end of the pipe, where it gives up the heat carried thereby, by condensing into the wick in order to repeat the cycle. This heat transfer process is efficient, as the heat pipes 50 are sealed and have no moving parts and require little or no maintainance.

As shown in FIG. 6a, the heat pipes 50' are finned at 56 for most efficient heat energy transfer.

In accordance with this invention, control means is provided to coordinate the air column circulation of the several columns of moving air involved. In practice, there are two basic types or modes of operation which may be implemented in utilizing the several embodiments hereinabove disclosed, the control means K as shown in FIG. 1 which employs Constant Volume Variable Temperature control, and the control means K' as shown in FIG. 5 wich employs Variable Volume Constant Temperature control. In each of said control means K and K' there are means repsonsive to both temperature and humidity and which together govern the operation of the various means involved. As shown, there is a control means K (K') responsive to the air conditioned space temperature and humidity as by temperature sensor means means 60 and humidity sensor means 61 and responsive to outside air temperature and mixed intake air temperature as by temperature sensor means 62 and 63 placed in the ouside air inlet duct 14 and at the entry or mixed air into the evaporator cooling coil 9. A feature of this invention is that the refrigeration and dehumidification function outputs vary according to the temperature and humidity requirements in response to the aforesaid sensor means. And the air volume or air temperature may be inversely employed according to either of the types or modes of operation, as next described.

Referring now to the Constant Volume Variable Temperature mode of operation shown in FIG. 1 of the drawings, minimum outside air intake through duct 13 is adjustably controlled by a fixed damper 64, while the drive motor 65 operates the blower 37 at a constant speed for delivery of supply air through duct 15. The control means K coordinates the temperature and humidity information from sensor means 60–63; so as to control the variable speed motor 26 driving the desiccant wheel 25, through inverter means 66, increased speed removing more moisture; so as to inversely control the positions of the damper and control means 11 and 12 through actuator means 67 and 68, in order for example to maximize cooling with outside air; so as to control the speed of the blower means 40', through an actuator 70, in order to provide air flow commensurate with the position of the damper and control means 11; so as to control the position of damper and control means 42 with repsect to the position of damper and control means 11 and 12, through actuator means 69; so as to control the speed of the compressor and motor means 33 of the refrigeration means, through an inverter means 71, in order to avoid cycling losses; and so as to control the speed of variable speed motor 72 driving the blower 44, through an inverter means 72, in order to control the air temperature for desiccant regeneration and/or rejection of compressor heat; all as circumstances require, it being understood that state of the art means are implemented for the functions hereinabove described.

Referring now to the Variable Volume Constant Temperature mode of operation shown in FIG. 5 of the drawings, minimum outside air intake through duct 13 is by blower means 75 controlled for a variable rate of intake volume driven at a variable rate of intake volume by a variable speed motor 76 having inverter means 77, while the blower 37 is driven by a variable speed motor 65 controlled by an inverter means 77' responsive to the control means K'. The inverter means 66 varies the speed of the desiccant wheel 50, the inverter means 71 varies the speed of the compressor means 33, the inverter means 78 varies the speed of the blower 44 and motor 72, the actuator means 67 and 68 control the positions of damper and control means 11 and 12, the inverter means 70 controls the speed of blower means 40', and the actuator means 69 controls the position of damper and control means 42, all as hereinabove described with respect to the Constant Volume Variable Temperature Control. The control means K' coordinates the temperature and humidity information from sensor means 60–63, so as to control the motors and dampers as shown, and further so as to control the speed of motor 65 through the inverter means 77, all as circumstances require, it being understood that state of the art means are implemented for the functions herein described.

Referring now to the embodiment of FIG. 3 of the drawings, the packed type desiccant dehumidifier and desuperheater 28 are operated at variable outputs by control of variable speed motor 78, through an inverter means 79 responsive to the control means K (K'), all as circumstances may require, it being understood that state of the art means are employed for the functions herein described.

Having described only the typical preferred forms and applications of my invention, I do not wish to be limited or restricted to the specific details herein set forth, but wish to reserve to myself any modification or variations that may appear to those skilled in the art as set forth within the limits of the following claims.

I claim:

1. A desiccant assisted air conditioning system for delivering dehumidified refrigerated supply air into a conditioned space and with return therefrom divided between recirculation air and exhaust - relief air employed to remove heat resulting from dehumification and employing waste heat from refrigeration for desiccant regeneration, and including;

a first outside air inlet duct inducting minimum outside air through a dehumidifying section of a desiccant dehumidifying means, a second outside air inlet duct inducting maximum outside air and connected into said first duct for mixing with the air conducted through the dehumidifier means and delivering mixed air through a cooling coil of a refrigeration means, a blower means for circulating the mixed air through the cooling coil and through a third supply air duct opening into the conditioned space, the refrigeration means being comprised of a compressor means delivering liquid refrigerant through a condenser coil for discharge of waste heat and through means for expansion in said cooling coil and return to the compressor means as a gas, a fourth return air duct from the conditioned space and connected into said second outside air inlet duct downstream from a damper and control means therein to regulate volume inlet of maximum outside air and volume recirculation of return air, a fifth relief air duct from the conditioned space and conducting conditioned space air through an evaporative air cooling means and discharging to exhaust through a heat exchanger means passing and cooling heated air from the dehumidifying section of the dehumidifying means upstream of said mixing with air delivery through the cooling coil, a sixth outside air duct and blower means delivering air through the condenser coil of the refrigeration means for the absorption of waste heat and conducting the same through a desiccant regenerating section of the dehumidifying means and to exhaust, and control means coordinating the damper and control means and operation of the dehumidifying means and refrigeration means.

2. The desiccant assisted air conditioning system as set forth in claim 1, wherein the fifth relief air duct is connected to the fourth return air duct from the conditioned space.

3. The desiccant assisted air conditioning system as set forth in claim 1, wherein damper and control means in the fourth return air duct regulates the exhaust through the fifth relief air duct substantially equal to the inducting of minimumn outside air through the first outside air duct.

4. The desiccant assisted air conditioning system as set forth in claim 1, wherein damper and control means in the fifth relief air duct opens into an exhaust and regulates exhaust of relief air not required in the exhaust of cooled relief air through the heat exhanger means removing dehumidifier heat from the inlet duct of minimum outside air.

5. The desiccant assisted air conditioning system as set forth in claim 1, wherein a seventh transfer duct transfers the exhaust of the fifth relief air duct through the heat exchanger means and to the sixth outside air duct and blower means to mix with an to add heat to the delivery of air through the condenser coil.

6. The desiccant assisted air conditioning system as set forth in claim 1, wherein the desiccant dehumidifying means is a wheel type desiccant dehumidifier means continuously rotated by motor means with a first portion thereof progressively exposed to the first outside air inlet duct as the dehumidifying section and with a second portion thereof progressively exposed to the sixth outside air duct and blower means as the regenerating section.

7. The desiccant assisted air conditioning system as set forth in claim 1, wherein the desiccant dehumidiifying means is a wheel type desiccant dehumidifying means continuously rotated by variable speed motor and control means and with a first portion thereof exposed to the first outside air inlet duct as the dehumidifying section and with a second portion thereof progressively exposed to the sixth outside air duct and blower means as the regenerating section.

8. The desiccant assisted air conditioning system as set forth in claim 1, wherein a seventh trandfer duct transfers the exhaust of the fifth relief air duct through the heat exhanger means and to the sixth outside air duct and blower means to mix with and to add heat to the delivery of air through the condenser coil, and wherein the desiccant dehumidifying means is a wheel type desiccant dehumnidifying means continuously rotated by motor means with a first portion thereof progressively opened to the first outside air inlet duct as the dehumidifying section and with a second portion thereof progressively exposed to the sixth outside air duct and blower means as the regenerating section.

9. The desiccant assisted air conditioning system as set forth in claim 1, wherein a seventh transfer duct transfers the exhaust of the fifth relief air duct through the heat exhanger means and to the sixth outside air duct and blower means to mix with an to add heat to the delivery of air through the condenser coil, and wherein the desiccant dehumidifying means is a wheel type desicant dehumidifying means continuously rotated by variable speed motor and control means and with a first portion thereof exposed to the first outside air inlet duct as the dehumidifying section and with a second thereof progressively exposed to the sixth outside air duct and blower means as the regenerating section.

10. The desiccant assisted air conditioning system as set forth in claim 1, wherein the desiccant dehumidifying means is a packed type dessiccant dehumidifying means with stationary dehumidifying and regenerating sections in the first and second outside air inlet ducts respectively.

11. The desiccant assisted air conditioning system as set forth in claim 10, wherein a desuperheater means passes refrigeration gas to the compressor of the refrigeration means and cools desiccant liquid sequentially discharged over the regenerating section and dehumidifying section, by pump means.

12. The desicant assisted air conditioning system as set forth in claim 1, wherein a seventh transfer duct transfers the exhaust of the fifth relief air duct through the heat exchanger means and to the sixth outside air duct and blower means to mix with and to add heat to the delivery of air through the condenser coil, and wherein the desiccant dehumidifying means is a packed type desiccant dehumidifying means with stationary dehumidifying and regenerating sections in the first and second outside air inlet ducts respectively.

13. The desiccant assisted air conditioning system as set forth in claim 1, wherein a seventh transfer duct transfers the exhaust of the fifth relief air duct through the heat exchanger means and to the sixth oustside air duct and blower means to mix with and to add heat to the delivery of air thnrough the condenser coil, wherein the desiccant dehumidifying means is a packed type desiccant dehumidifying means with stationary dehumidifying and regenerating sections in the first and second outside air inlet ducts respectively, and wherein a desuperheater means passes refrigeration gas to the compressor of the refrigeration means and cools desiccant liquid sequentially discharged over the regenerating section and dehumidified by pump means.

14. The desiccant assisted air conditioning system as set forth in claim 11, wherein the desiccant liquid discharged over the regenerating section is collected in a sump discharging over the dehumidifying section, the pump means recirculating the desiccant liquid through a cooling coil immersed in the sump.

15. The desiccant assisted air conditioning system as set forth in claim 1, wherein liquid injection into the compressor of the refrigeration means is from the condenser coil and ahead of the means for expansion of refrigerant into the cooling coil.

16. The desiccant assisted air conditioning system as set forth in claim 1, wherein liquid injection into the compressor of the refrigeration means is from the desuperheater means and into the shell of a compressor.

17. The desiccant assisted air conditioning system as set forth in claim 1, wherein the heat exchanger means is comprised of at least one heat pipe with a "heat out" cold end exposed to exhaust air flow through the fifth relief air duct and a "heat in" hot end exposed to and cooling the heated air from the dehumidfying section of the dehumnidfying means.

18. A constant volume variable temperature desiccant assisted air conditioning system for delivering dehumidified refrigerated supply air into a conditioned space and with return therefrom divided between recirculation air and exhaust-relief air employed to remove heat resulting from dehumidification and employing waste heat from refrigeration for desiccant regeneration, and including;
   a first outside air inlet duct inducting minimum outside air through a dehumidifying section of a variable capacity desiccant dehumidifying means having inverter means control, a second outside air inlet duct inducting maximum outside air and connected into said first duct and with damper and control means having actuator means control for mixing maximum outside inlet air with minimum outside inlet air conducted through the dehumidifying means and delivering mixed air through a cooling coil of a refrigeration means, a blower and motor means for circulating a constant volume of mixed air through the cooling coil and through a third supply air duct opening into the conditioned space, the refrigeration means being comprised of a variable speed compressor and motor means having inverter means control and delivering liquid refrigerant through a condenser coil for discharge of waste heat and through means for expansion in said cooling coil and return to the compressor means as a gas, a fourth return air duct from the conditioned space and connected into said second outside air inlet duct downstream from the damper and control means therein for recirculation of return air, a fifth relief air duct from the conditioned space and with damper and control means having actuator means regulating flow of said relief air and with a variable speed blower and motor means having inverter means control and delivering the regulated flow of conditioned space air through an evaporative air cooling means for discharge to exhaust through a heat exchanger means passing and cooling heated air from the dehumidifying section of the dehumidifying means upstream of said mixing with air delivery through the cooling coil, a sixth outside air duct and variable speed blower and motor means having inverter means control and delivering air through the condenser coil of the refrigeration means for the absorption of waste heat and conducting the same through a desiccant regenerating section of the dehumidifying means and to exhaust, and control means coordinating the actuator means controls and the inverter means controls.

19. A variable volume constant temperature desiccant assisted air conditioning system for delivering dehumidified refrigerated supply air into a conditioned space and with return therefrom divided between recirculation air and exhaust-relief air employed to remove heat resulting from dehumidification and employing waste heat from refrigeration for desiccant regeneration, and including;

a first outside air inlet duct and variable speed blower and motor means having inverter means control and inducting minimum outside air through a dehumidifying section of a variable capacity desiccant dehumidifying means having inverter means control, a second outside air inlet duct inducting maximum outside air and connected into said first duct with damper and control means having an actuator means control for mixing maximum outside inlet air with minimum outside inlet air conducted through the dehumidifying means and delivering mixed air through a cooling coil of a refrigeration means, a variable speed blower and motor means for circulating a variable volume of mixed air through the cooling coil and through a third supply air duct opening into the conditioned space, the refrigeration means being comprised of a variable speed compressor and motor means having inverter means control and delivering liquid refrigerant through a condenser coil for discharge of waste heat and through means for expansion in said cooling coil and return to the compressor means as a gas, a fourth return air duct from the conditioned space and connected into said second outside air inlet duct downstream from the damper and control means therein for recirculation of return air, a fifth relief air duct from the conditioned space and with damper and control means having actuator means regulating flow of said relief air and with a variable speed blower and motor means having inverter means control and delivering the regulated flow of conditioned space air through an evaporative air cooling means for discharge to exhaust through a heat exchanger means passing and cooling heated air from the dehumidifying section of the dehumidifying means upstream of said mixing with air delivery through the cooling coil.

a sixth outside air duct and variable blower and motor means having inverter means control and delivering air through the condenser coil of the refrigeration means for the absorption of waste heat and conducting the same through a desiccant regenerating section of the dehumidifying measn and to exhaust, and control means coordinating the actuator means controls and the inverter means controls.

* * * * *

UNITED STATES PATENT AND TRADEMARK OFFICE
CERTIFICATE OF CORRECTION

PATENT NO. : 4,887,438

DATED : Dec. 19, 1989

INVENTOR(S) : MILTON MECKLER

It is certified that error appears in the above—identified patent and that said Letters Patent is hereby corrected as shown below:

IN THE DRAWINGS:
Fig. 3 change "D" to -- D' --; change "21" to -- 21' --; and add numeral and lead line -- 29____ --, extending said lead line to the liquid filled sump underlying section 21'.

Col. 4 line 62 change "desiccaant" to --desiccant--. Col 5 line 17 change "conventioanl" to --conventional--. Col. 6 line 3 change "dehumifying" to --dehumidifying--. Col. 7 line 4 change "comnpres-" to --compres-; line 35 change "dehumumidified" to --dehumidified--; and line 49 change "19" to -- 9 --. Col. 8 line 47 change "orative" to --orator--. Col. 9 line 3 change "wich" to --which--; line 5 change "repsonive to --responsive--; line 37 change "actuator" to --inverter--; and line 40 change "repsect" to --respect--.

IN THE CLAIMS:
Col. 10 line 29 change "dehumification" to --dehumidification--. Col. 11 line 9 change "minimumn" to --minimum--; line 44 change "trandfer" to --transfer--; line 46 change "exhanger" to --exchanger--; and line 50 change "dehumnidifying" to --dehumidifying--. Col. 12 line 28 change "thnrough" to --through--; and line 58 change "dehumnidifying" to --dehumidifying.

UNITED STATES PATENT AND TRADEMARK OFFICE
CERTIFICATE OF CORRECTION

PATENT NO. : 4,887,438

DATED : December 19, 1989

INVENTOR(S) : Milton Meckler

It is certified that error appears in the above-identified patent and that said Letters Patent is hereby corrected as shown below:

Col. 14, line 48 change "measn" to --means--.

Signed and Sealed this

Nineteenth Day of November, 1991

*Attest:*

HARRY F. MANBECK, JR.

*Attesting Officer*  *Commissioner of Patents and Trademarks*